(12) United States Patent
Lee

(10) Patent No.: US 8,826,054 B2
(45) Date of Patent: Sep. 2, 2014

(54) COMPUTER SYSTEM AND CONTROL METHOD THEREOF

(75) Inventor: Tae-hoon Lee, Suwon-si (KR)

(73) Assignee: Samsung Electronics Co., Ltd, Suwon-si (KR)

( * ) Notice: Subject to any disclaimer, the term of this patent is extended or adjusted under 35 U.S.C. 154(b) by 384 days.

(21) Appl. No.: 13/025,564

(22) Filed: Feb. 11, 2011

(65) Prior Publication Data

US 2011/0314307 A1  Dec. 22, 2011

(30) Foreign Application Priority Data

Jun. 18, 2010 (KR) .................. 10-2010-0058015

(51) Int. Cl.
*G06F 1/00* (2006.01)

(52) U.S. Cl.
USPC ........................................... 713/324

(58) Field of Classification Search
CPC ... G06F 1/3203; G06F 1/3253; G06F 1/3287; G06F 1/3275
USPC ................................. 713/300–340
See application file for complete search history.

(56) References Cited

U.S. PATENT DOCUMENTS

| | | | | |
|---|---|---|---|---|
| 5,822,599 A * | 10/1998 | Kidder et al. | .......... | 713/324 |
| 5,974,559 A * | 10/1999 | Bannai | ............ | 713/330 |
| 6,523,123 B1 * | 2/2003 | Barbee | ............ | 713/300 |
| 6,574,740 B1 * | 6/2003 | Odaohhara et al. | ...... | 713/323 |
| 7,020,787 B2 * | 3/2006 | Takashima et al. | ...... | 713/320 |
| 7,100,013 B1 * | 8/2006 | de Waal | ............ | 711/170 |
| 7,383,448 B2 * | 6/2008 | Kohara | ............ | 713/300 |
| 7,395,442 B2 * | 7/2008 | Sekine et al. | ........ | 713/320 |
| 7,596,705 B2 * | 9/2009 | Kim | ............ | 713/300 |
| 7,770,040 B2 * | 8/2010 | Aleksic et al. | ........ | 713/320 |
| 7,949,817 B1 * | 5/2011 | Sakarda | ............ | 710/307 |
| 8,069,355 B2 * | 11/2011 | Simeral et al. | ........ | 713/300 |
| 8,161,304 B2 * | 4/2012 | Hamilton | ............ | 713/320 |
| 8,166,215 B2 * | 4/2012 | Venkataraman et al. | .... | 710/58 |
| 8,365,000 B2 * | 1/2013 | Lee | ............ | 713/324 |
| 2007/0043965 A1 * | 2/2007 | Mandelblat et al. | ...... | 713/324 |
| 2009/0119527 A1 * | 5/2009 | Kim | ............ | 713/323 |
| 2010/0005327 A1 * | 1/2010 | Murata | ............ | 713/320 |

FOREIGN PATENT DOCUMENTS

| | | | | |
|---|---|---|---|---|
| EP | 807902 A2 * | 11/1997 | ............ | G06T 15/70 |
| JP | 09-214860 | 8/1997 | | |
| JP | 09-281940 | 10/1997 | | |
| JP | 2004-205577 | 7/2004 | | |

* cited by examiner

*Primary Examiner* — Paul R Myers
(74) *Attorney, Agent, or Firm* — Stanzione & Kim, LLP (57) ABSTRACT

A computer system and a control method thereof, the computer system includes a host unit which includes a plurality of lines, a plurality of memory units to which power is selectively supplied, a power supply which supplies power to the plurality of memory units, a graphic processor which connects with the host unit through the plurality of lines and accesses the plurality of memory unit, and a controller which controls supply of power to the plurality of memory units on the basis of an operation mode of the host unit, controls whether to use the plurality of lines in transmitting data in accordance with the supply of power to the plurality of memory units, and controls the graphic processor not to access the memory units receiving no power among the plurality of memory units.

19 Claims, 5 Drawing Sheets

| OPERATION MODE | PROGRAM | LINE | MEMORY UNIT TO BE SUPPLIED WITH POWER |
|---|---|---|---|
| FIRST MODE | STANDBY MODE/ WORD PROCESSING | ① | FIRST MEMORY UNIT |
| SECOND MODE | 2D IMAGE | ① ~ ⑧ | FIRST AND SECOND MEMORY UNITS |
| THIRD MODE | 3D IMAGE | ① ~ ⑯ | FIRST THROUGH THIRD MEMORY UNITS |

COMPUTER SYSTEM AND CONTROL METHOD THEREOF

CROSS-REFERENCE TO RELATED APPLICATIONS

This application claims priority under 35 U.S.C. §119 from Korean Patent Application No. 10-2010-0058015, filed on Jun. 18, 2010 in the Korean Intellectual Property Office, the disclosure of which is incorporated herein in its entirety by reference.

BACKGROUND

1. Field of the Invention

Apparatuses and methods consistent with the exemplary embodiments relate to a computer system and a control method thereof, and more particularly, to a computer system to reduce power consumption and a control method thereof.

2. Description of the Related Art

With extension of multimedia and progress of a three dimensional (3D) and high performance game contents, the size of computer graphics and the performance and capacity of a graphic memory have been increased, and thus power consumption has also been increased. To reduce the power consumption in this condition, there is used a method of controlling a processing rate of the graphic memory in accordance with a load of graphics. That is, a computer employing a plurality of graphic memories supplies power to all the memory and controls the processing rate of the memory according to the kinds of programs. For example, if the memory has a processing rate of 800 [MHz], the computer may drive the memory to operate at a processing rate of 800 [MHz] in a high driving speed, at a processing rate of 405 [MHz] or 135 [MHz] in a low driving speed, and so on.

In the case of the low driving speed, only some memories are enough to process data. Nevertheless, power is supplied to all the memories, so that the power is wasted. Further, in the case of transmitting graphic data to display an image, power is also wasted since all data lines are used regardless of a data throughput.

SUMMARY

Accordingly, one or more exemplary embodiments of the present general inventive concept provide a computer system capable of reducing power consumption and a control method thereof.

Additional aspects and utilities of the present general inventive concept will be set forth in part in the description which follows and, in part, will be obvious from the description, or may be learned by practice of the present general inventive concept.

The foregoing and/or other features and embodiment of the present general inventive concept may be achieved by providing a computer system including a host unit which includes a plurality of lines, a plurality of memory units to which power is selectively supplied, a power supply which supplies power to the plurality of memory units; a graphic processor which connects with the host unit through the plurality of lines and accesses the plurality of memory unit, and a controller which controls supply of power to the plurality of memory units on the basis of an operation mode of the host unit, controls whether to use the plurality of lines in transmitting data in accordance with the supply of power to the plurality of memory units, and controls the graphic processor not to access the memory units receiving no power among the plurality of memory units.

The computer system may further include a detector which detects an operation mode of the host unit, wherein the operation mode is based on a program executed in the host unit.

The plurality of memory units may include a first memory unit which is continuously supplied with power during operation of the host unit; and second and third memory units which are selectively supplied with power.

If the operation mode is a first mode, the controller may control the second and third memory units not to be supplied with power, and one line among the plurality of lines to be used in transmitting data.

If the operation mode is a second mode, the controller may control one of the second and third memory units to be supplied with power, and some lines among the plurality of lines to be used in transmitting data.

If the operation mode is a third mode, the controller may control all the memory units to be supplied with power, and all the plurality of lines to be used in transmitting data.

The power supply may include a switch to supply power to the plurality of memory units, and the controller may transmit a control signal for controlling the switch via the graphic processor.

The graphic processor may output the control signal through a general purpose input/output (GPIO) pin.

The plurality of lines may include a peripheral component interconnect express (PCIE) data bus.

The foregoing and/or other features and embodiment of the present general inventive concept can also be achieved by providing a method of controlling a computer system, the method including detecting an operation mode of a host unit including a plurality of lines, controlling selective supply of power to a plurality of memory units on the basis of the operation mode of the host unit, controlling a graphic processor, connecting with the host unit through the plurality of lines, not to access the memory units receiving no power among the plurality of memory units, and controlling whether to use the plurality of lines in transmitting data in accordance with the supply of power to the plurality of memory units.

The detecting may include detecting the operation mode based on a program executed in the host unit.

The plurality of memory units may include a first memory unit which is continuously supplied with power during operation of the host unit; and second and third memory units which are selectively supplied with power, and the controlling the selective supply of power may include controlling supply of power to the second and third memory units.

If the operation mode is a first mode, the controlling the supply of the power may include controlling the second and third memory units not to be supplied with power, and the controlling whether to use the plurality of lines may include controlling one line among the plurality of lines to be used in transmitting data.

If the operation mode is a second mode, the controlling the supply of the power may include controlling one of the second and third memory units to be supplied with power, and the controlling whether to use the plurality of lines may include controlling some lines among the plurality of lines to be used in transmitting data.

If the operation mode is a third mode, the controlling the supply of the power may include controlling all the memory units to be supplied with power, and the controlling whether to use the plurality of lines may include controlling all the plurality of lines to be used in transmitting data.

The controlling the supply of the power may include outputting a control signal, for the supply of the power to the plurality of memory units, via the graphic processor.

The foregoing and/or other features and embodiment of the present general inventive concept can also be achieved by providing a computer system including a plurality of memory units; a power supply to supply which supplies power to the plurality of memory units, a graphic processor to access the memory units, a controller to select the memory unit according to different operation modes, to control the power supply to selectively supply the selected memory units, and to control the graphic processor to selectively access the selected memory units.

The computer system may further include a host unit connected to the graphic processor through a plurality of data lines, and the host unit may select a predetermined number of the data lines to communicate with the graphic processor according to the different operation modes.

The plurality of memory units each may store data corresponding to the corresponding one of the respective different operation modes.

The graphic processor may access a combination of the plurality of memory units, and the combination of the plurality of memory units is a combination of memory units supplied with the power from the power supply unit.

The different operation modes may include an operation mode to process data for a two-dimensional image and an operation mode to process data for a three-dimensional image.

BRIEF DESCRIPTION OF THE DRAWINGS

The above and/or other aspects of the present general inventive concept will become apparent and more readily appreciated from the following description of the exemplary embodiments, taken in conjunction with the accompanying drawings, in which.

DETAILED DESCRIPTION OF THE EMBODIMENTS

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures.

Figure 1:
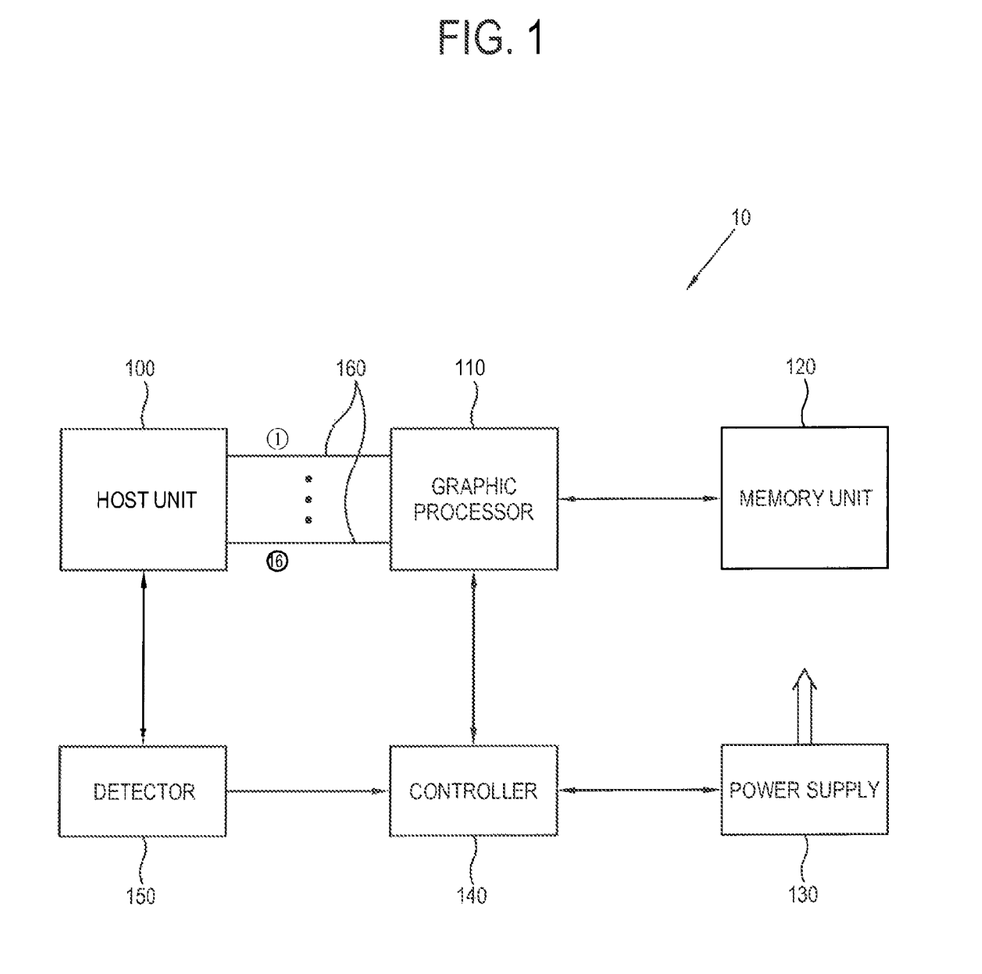
FIG. 1 is a view illustrating a configuration of a computer system according to an exemplary embodiment of the present general inventive concept.

FIG. 1 is a view illustrating a configuration of a computer system 10 according to an exemplary embodiment of the present general inventive concept.

As illustrated in FIG. 1, the computer system 10 in this exemplary embodiment includes a host unit 100, a graphic processor 110, a memory unit 120, a power supply 130, a detector 150 and a controller 140.

The host unit 100 includes a central processing unit CPU (not illustrated), a main memory including a volatile memory, a hard disk, a basic input/output system (BIOS) read only memory (ROM), etc., controls general operation of the computer system 10, stores a program, and executes a program in response to a user's input. The host unit 100 connects with the graphic processor 100 through a plurality of data lines 160. The data line 160 may include a peripheral component interconnect express (PCIE) data bus. FIG. 1 shows first to sixteenth data lines 160 by way of example.

The graphic processor 110 processes graphic data, and the computer system 10 may include a display unit (not illustrated) to display an image based on the graphic data processed by the graphic processor 110. The graphic processor 110 may include a graphic processing unit (GPU). The computer may output the processed graphic data to an external display unit to display an image corresponding to the processed graphic data. The display unit may be installed in a housing body of the computer system 10 to communicate with the host unit 100 and/or the graphic processor 110 to receive the processed graphic data to be displayed thereon. It is possible that the external display unit can be connected to the computer system 10 through a wired or wireless communication system.

The memory unit 120 includes a plurality of memory units, and power may be selectively supplied to each memory unit. The graphic processor 110 accesses each memory unit and processes the graphic data. The memory unit 120 may includes a plurality of double data rate (DDR) 3 synchronous dynamic random access memories (SDRAMs), gDDR3 SDRAMs, GDDR3 SDRAMs, GDDR5 SDRAMs, etc.

The power supply 130 supplies power to the memory unit 120. The power supply 130 may include a switch (not shown) for selectively supplying power to the memory unit 120.

The detector 150 detects an operation mode of the host unit 100. At this time, the detector 150 may detect the operation mode on the basis of a program executed by the host unit 100. For example, the operation mode is detected on the basis of whether a program having a high data throughput is executed or a program having a low data throughput is executed.

The operation mode may be determined according to a characteristic of the graphic data, for example, different resolutions, two or three dimensional graphic data, usage of data stored in respective memory units, usage of respective memory units, usage of a number of data lines, etc.

The controller 140 controls supply of power to the memory unit 120 and access between the graphic processor 110 and the memory unit 120 on the basis of the operation mode of the host unit 100. Also, the controller 140 controls transmission of data through the data lines 160 provided in the host unit 100 in accordance with the supply of power to the memory unit 120. That is, it is controlled whether to use all of the data lines 160 or only some of the data lines 160 in transmitting/receiving data between the graphic processor 110 and the host unit 100. Also, it is controlled to select a particular number of data lines 160 to transmit the data according to a characteristic of the data or the operation mode.

The host unit 100 outputs the data to the graphic processor 110 through the selected number of the data lines 160 such that the graphic processor 110 can access the memory units 120 supplied with power to read the graphic data and process the read graphic data. The graphic processor 100 does not access the non-selected memory units which are not supplied with the power. It is possible that the graphic processor 110 may select the memory units 120 to selectively access the memory units 120 according to the received data. It is possible that the graphic processor may select the memory units 120 to selectively read data from the selected memory units 120 according to the selected data lines 160 or a characteristic of the data transmitted through the selected data lines 160.

The host unit 100 may outputs to the detector 150 a signal representing the operation mode or the characteristic of the data, and then the controller 140 generates a signal to respectively select the memory units 120 to be supplied with power from the power supply 130 according to a signal output from the detector 150.

When the controller 140 controls the power supply to selectively supply power to the memory units 120, the controller 140 may generate to the graphic processor 110 a signal representing information on the selected memory units 120 supplied with power from the power supply 130.

The graphic processor 110 may access the selected memory units 120 according to the signal received from the controller 140 or data received from the host unit 100. The controller 140 may be formed with the detector 150 in a single unit and may perform the operation of the detector 150.

It is also possible that the host unit 100 outputs to the graphic processor 110 through the selected data lines 160 the data corresponding to the graphic image and the signal representing the operation mode to select the memory units 120 to be supplied with power from the power supply 130.

It is possible that transmission of signal corresponding to selection of the memory units 120 from the host unit 100 to the controller 140 or the power supply 130 and transmission of the data from the host unit 100 to the graphic processor 110 can be simultaneously performed. It is possible that the transmission of signal corresponding to selection of the memory units 120 from the host unit 100 to the controller 140 or the power supply 130 is performed and then transmission of the data from the host unit 100 to the graphic processor 110 can be performed.

Figure 2:
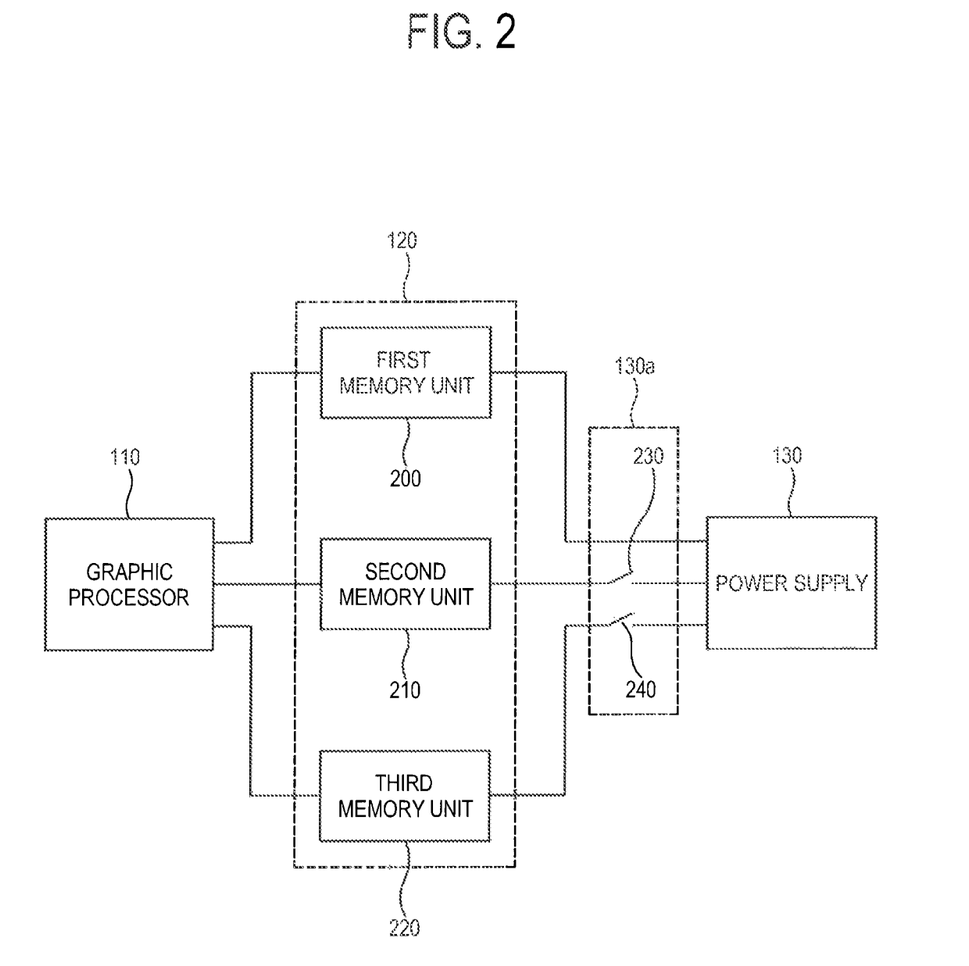
FIG. 2 is a detailed view of a memory unit of the computer system according to an exemplary embodiment.

FIG. 2 is a detailed view of the memory unit 120 of the computer system 10 according to an exemplary embodiment of the present general inventive concept.

As illustrated in FIG. 2, the memory unit 120 may include a first memory unit 200, a second memory unit 210 and a third memory unit 220. Here, the first memory unit 200 may be continuously supplied with power when the host unit 100 is operating, but the second unit 210 and third memory unit 220 may be selectively supplied with power according to a graphic data throughput. To this end, the power supply 130 may be connected to the second unit 210 and third memory unit 220 via a switching unit 130a including a first switch 230 and a second switch 240, for example.

The first memory unit 20 may be accessed by the graphic processor 110 to read the graphic data which can be used in different operation modes. The second memory unit 210 or the third memory unit 220 may be accessed by the graphic processor 110 to read the graphic data which can be used in one of the different operation modes.

The controller 140 may directly transmit a control signal to the power supply 130, or transmit the control signal to the power supply 130 via the graphic processor 110. To this end, the graphic processor 110 may include a general purpose input/output (GPIO) pin. In this case, the control signal of the controller 140 to select the memory units 120 to be supplied with power can be transmitted through the GPIO pin of the graphic processor 110 to the power supply 130 such that the power supply 130 can selectively supply power to the selected memory units 120.

The graphic processor 110 can access each of the first to third memory units 200 to 220. Thus, if one of the second memory unit 210 and the third memory unit 220 is not supplied with power, the controller 140 controls the graphic processor 110 not to access the memory unit 210 or 220 being supplied with no power.

A data transmission bit number of the memory unit 120 corresponds to a data processing capability of the graphic processor 110. That is, if the graphic processor 110 can transmit/receive data at 128 bits, the memory unit 120 can transmit/receive data at 128 bits. To this end, the first and second memory units 200 and 210 may be configured to transmit/receive data at 32 bits and 64 bits, respectively.

Figure 3:
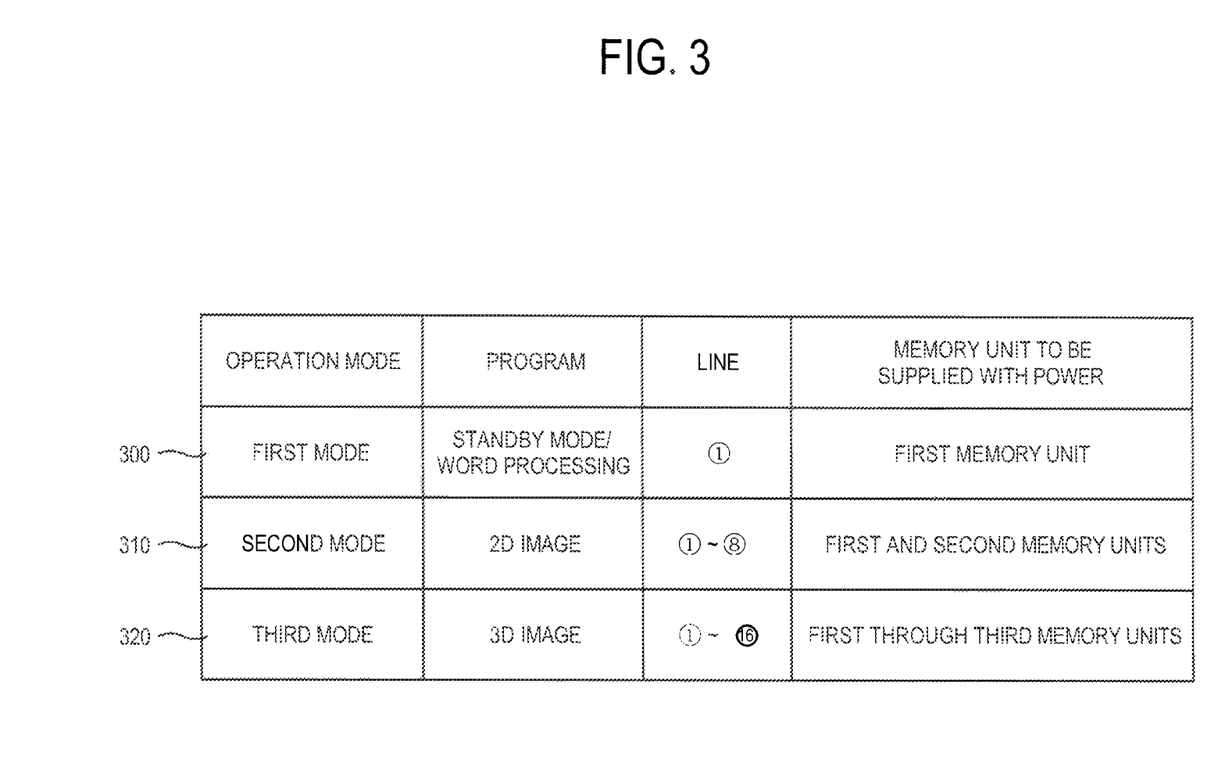
FIG. 3 is a view illustrating an operation of the computer system according to an exemplary embodiment.

FIG. 3 is a view illustrating a method of the computer system 10 according to an exemplary embodiment of the present general inventive concept. In FIG. 3, the same reference numerals as those illustrated in FIGS. 1 and 2 refer to the same elements as those illustrated in FIGS. 1 and 2.

As illustrated in FIG. 3, the operation mode may be divided into first through third modes 300 through 320 different in operation. Below, the operation of each mode will be described in more detail.

First, a first mode 300 may refer to a standby mode of the computer system 10 or a case that the host unit 100 executes a program for word processing. In the first mode 300, a data throughput of the graphic processor 110 is not so high that the controller 140 controls the second and third memory units 210 and 220 not to be supplied with power and the graphic processor 110 to access only the first memory unit 200. In this case, the first memory unit 200 stores data corresponding to the word processing. The read data can be processed in the graphic processor 110 and then the processed data can be transmitted to the host unit 100 or stored in the first memory unit 200.

Also, the controller 140 allows data to be transmitted/received between the host unit 100 and the graphic processor 110 through the first data line 160, but prevents data from being transmitted/received through the second to sixteenth data lines 160.

A second mode 310 may refer to a case that the host unit 100 executes a program for a two-dimensional (2D) image. At this time, the program for the 2D image has more data throughput and higher processing speed than those of the program for the word processing. Therefore, the controller 140 controls the second memory unit 210 to receive power, and the graphic processor 110 can access the first and second memory units 200 and 210. Also, one or more, but not all, lines 160 are used between the host unit 100 and the graphic processor 110. For example, the first to eighth lines 160 are used in transmitting/receiving data, but the ninth to sixteen lines 160 are not used. The lines to be used may be determined on the basis of a data throughput transmitted/received between the host unit 100 and the graphic processor 110. For example, the lines 160 to be used may be determined on the basis of the amount of data transmission, the capacity of the transmission lines 160, a transmission rate, etc, so that data can be smoothly transmitted without any overload. In this case, the first memory unit 200 and the second memory unit 210 may store data corresponding to the two-dimensional (2D) image.

A third mode 320 may refer to a case that the host unit 100 executes a program for a three-dimensional (3D) image or a high graphic game. At this time, since the data throughput is so high that power can be supplied to the first to third memory units 200 to 220 and all lines 160 of the host unit 100 are used. In this case, the first memory unit 200, the second memory unit 210, and the third memory unit 220 may store data corresponding to the three-dimensional (3D) image.

Here, a method of determining the operation mode will be illustrated as an example. Thus, the respective operation modes may be different or distinguished from each other according to characteristics of the program executed in the host unit 100. Also, the programs corresponding to the respective operation modes may be previously set and relevant data may be stored in a separate storage (not illustrated).

Figure 4:
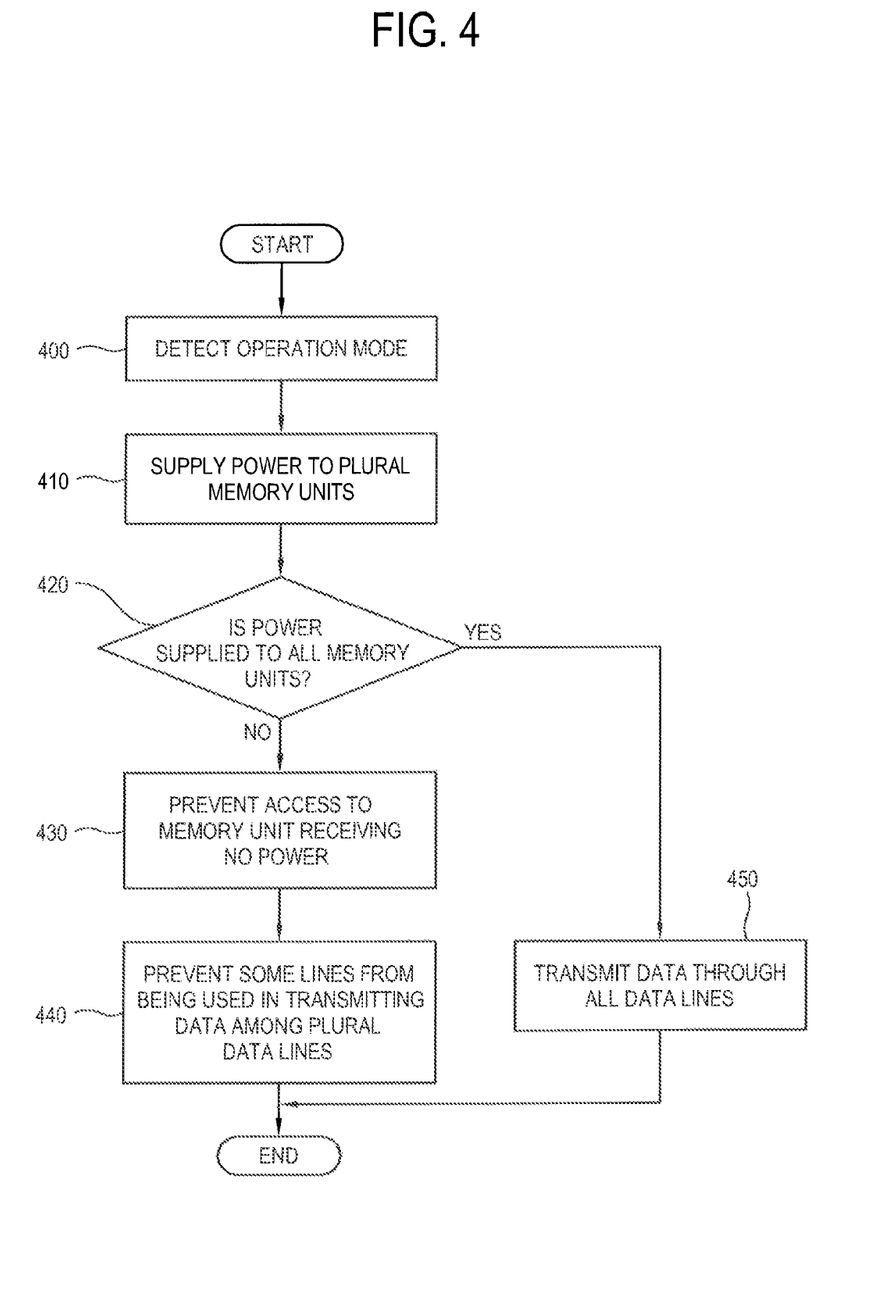
FIG. 4 is a flowchart illustrating the operation of the computer system according to an exemplary embodiment.

FIG. 4 is a flowchart illustrating a method of the computer system according to an exemplary embodiment of the present general inventive concept.

If the detector 150 detects the operation mode of the host unit 100 including the plurality of lines 160 at operation 400, the controller 140 controls selective supply of power to the plurality of memory units 120 on the basis of the operation mode at operation 410. If some memory units 120 receive no power (No of operation 420), the controller 140 controls the graphic processor 110, connecting with the host unit 100 through the plurality of lines 160, not to access the memory units 120 receiving no power at operation 430. Also, the controller 140 controls some lines 160 among the plurality of lines 160 not to be used in transmitting the processed graphic data at operation 440.

On the other hand, if all the memory units 120 receive power (Yes of operation 420), the controller 140 controls all the lines 160 to be used in transmitting the processed graphic data at operation 450.

Figure 5:
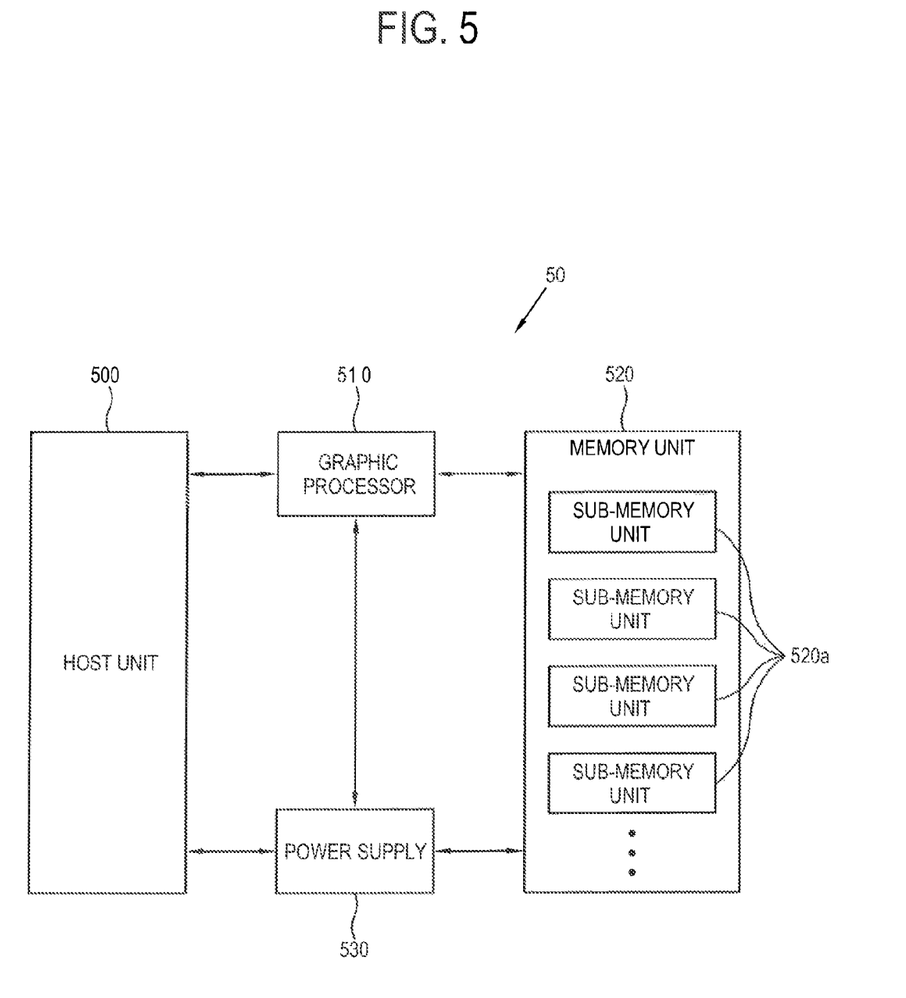
FIG. 5 is a view illustrating a computer system according to an embodiment of the present general inventive concept.

As illustrated in FIG. 5, the computer system 50 may include a host unit 500, a graphic processor 510, a memory unit 520 including a plurality of sub-memory units 520a, and a power supply unit 530. The host unit 500 outputs one or more commands or signals (data) to the graphic processor 510. The commands or signals (data) may be PCIE data generated from the host unit 500 according to a characteristic of the graphic data to be processed. The host unit 500 may outputs one or more second commands or signals (control signal) to the power supply unit 520. The second commands or signals (control signal) may be used to represent the PCIE data, an operation of the graphic processor 510, a selection of the sub-memory units 520a of the memory unit 520, etc. The second commands or signals (control signal) may represent the operation mode. According to the commands or signals as described above, the power supply 530 selectively supply power to the selected sub-memory units 520a, and the graphic processor 510 selectively accesses the selected sub-memory units 520a of the memory unit 520.

The power supply 530 and the graphic processor 510 may communicate with each other with respect to information on the selected sub-memory unit 520a. The graphic processor accesses the memory unit 520 to read data from the selected sub-memory units 520, to process the read data, to write the processed data in the selected sub-memory units 520a, and/or to transmit the read, processed, or written data to the host unit 500.

In this case, it is possible that the host unit 500 may perform functions of the host unit 100, the detector 150, and the controller 140.

The processed graphic data may be transmitted to a display unit directly from the graphic processor 510 or through the host unit 500. The display unit may be directly connected to the graphic processor 510 or the host unit 500. Therefore, the display unit may be installed in a housing of the computer system 500 or may be connected to the computer system 500 using wired or wireless communication to transmit the processed graphic data. Since wired or wireless communication is well known, detail descriptions thereof will be omitted.

The present general inventive concept can also be embodied as computer-readable codes on a computer-readable medium. The computer-readable medium can include a computer-readable recording medium and a computer-readable transmission medium. The computer-readable recording medium is any data storage device that can store data as a program which can be thereafter read by a computer system. Examples of the computer-readable recording medium include read-only memory (ROM), random-access memory (RAM), CD-ROMs, magnetic tapes, floppy disks, and optical data storage devices. The computer-readable recording medium can also be distributed over network coupled computer systems so that the computer-readable code is stored and executed in a distributed fashion. The computer-readable transmission medium can transmit carrier waves or signals (e.g., wired or wireless data transmission through the Internet). Also, functional programs, codes, and code segments to accomplish the present general inventive concept can be easily construed by programmers skilled in the art to which the present general inventive concept pertains.

The computer system may be a personal computer, a mobile communication device, a laptop computer, a cell phone, a tablet, a portable recording and reproducing apparatus, etc. However, the present general inventive concept is not limited thereto. The computer system may be an apparatus having a plurality of memories each to store data thereon to perform one of different graphic operations, and a power supply to selectively supply the memories selected according to the different graphic operations.

As described above, power is selectively and individually supplied to a plurality of memory units in accordance with a data throughput, thereby preventing wasteful power consumption.

Also, data lines are selectively used corresponding to supply of power to a plurality of memory units.

Although a few exemplary embodiments of the present general inventive concept have been shown and described, it will be appreciated by those skilled in the art that changes may be made in these exemplary embodiments without departing from the principles and spirit of the general inventive concept, the scope of which is defined in the appended claims and their equivalents.

What is claimed is:

1. A computer system comprising:
   a host;
   a plurality of graphic memories;
   a graphic processor which interfaces with the host via a plurality of data lines and selectively accesses to the plurality of graphic memories;
   a power supply configured to supply power to the plurality of graphic memories;
   a switching unit which selectively switches power supplied to the plurality of graphic memories; and
   a controller to determine a graphic data throughput of the graphic processor based on a program executed by the host resulting in a particular load, and to control the switching unit to selectively supply power to the plurality of graphic memories to use the plurality of data lines based on the determined graphic data throughput, and to control transmission of data through the plurality of data lines in accordance with the supply of power to the memory unit.

2. The computer system according to claim 1, wherein the detection of the operation mode of the graphic processor is further based on whether the computer system is in a standby mode.

3. The computer system according to claim 1, further comprising:
   a detector which detects an operation mode of the graphic processor.

4. The computer system according to claim 3, wherein the detector detects the operation mode on the basis of the program executed by the host.

5. The computer system according to claim 4, wherein the switching unit supplies power from the power supply to a first memory of the plurality of graphic memories without supplying power to a second memory and a third memory, if the operation mode is a first mode.

6. The computer system according to claim 5, wherein the switching unit supplies power from the power supply to the first memory and the second memory of the plurality of graphic memories without supplying power to the third memory, if the operation mode is a second mode.

7. The computer system according to claim 6, wherein the switching unit supplies power from the power supply to all the plurality of graphic memories, if the operation mode is a third mode.

8. The computer system according to claim 1, the controller transmits a control signal for controlling the switching unit via the graphic processor.

9. The computer system according to claim 8, wherein the graphic processor outputs the control signal through a general purpose input/output (GPIO) pin.

10. The computer system according to claim 1, further comprising:
a display unit configured to display an image processed by the graphic processor.

11. The computer system according to claim 10, wherein the computer system is one of a personal computer, a mobile communication device, a laptop computer, a cellular phone, a tablet, and a portable multi-media display.

12. A method of controlling a computer system, the method comprising:
determining a graphic data throughput of a graphic processor which interfaces with a host via a plurality of data lines on the basis of a program executed by the host resulting in a particular load;
transmitting a control signal to control a switching unit to selectively switch power supplied to a plurality of graphic memories being accessed by the graphic processor; and
selectively supplying power to the plurality of graphic memories based on the load for the determined graphic data throughput,
transmitting data through the plurality of data lines in accordance with the supply of power to the memory unit.

13. The method according to claim 12, wherein the determining a graphic data throughput further based on whether the computer system is in a standby mode.

14. The method according to claim 13, wherein the selectively supplying power to the plurality of graphic memories comprises supplying power to a first memory of the plurality of graphic memories without supplying power to a second memory and a third memory, if an operation mode is a first mode.

15. The method according to claim 14, wherein the selectively supplying power to the plurality of graphic memories comprises supplying power to the first memory and the second memory of the plurality of graphic memories without supplying power to the third memory, if the operation mode is a second mode.

16. The method according to claim 15, the selectively supplying power to the plurality of graphic memories comprises supplying power to all the plurality of graphic memories, if the operation mode is a third mode.

17. The method according to claim 12, wherein the control signal is transmitted to the switching unit via the graphic processor.

18. The method according to claim 12, wherein the computer system comprises a display unit configured to display an image processed by the graphic processor.

19. The method according to claim 18, wherein the computer system is one of a personal computer, a mobile communication device, a laptop computer, a cellular phone, a tablet, and a portable multi-media display.

* * * * *